United States Patent
Nakamura

(10) Patent No.: US 7,742,464 B2
(45) Date of Patent: Jun. 22, 2010

(54) SYSTEM AND METHOD FOR REMOTELY CONTROLLING A COMMUNICATION TERMINAL

(75) Inventor: Tetsuya Nakamura, Shizuoka (JP)

(73) Assignee: NEC Corporation (JP)

( * ) Notice: Subject to any disclaimer, the term of this patent is extended or adjusted under 35 U.S.C. 154(b) by 621 days.

(21) Appl. No.: 11/404,557

(22) Filed: Apr. 14, 2006

(65) Prior Publication Data

US 2006/0256778 A1    Nov. 16, 2006

(30) Foreign Application Priority Data

Apr. 14, 2005    (JP) .............................. 2005-116384

(51) Int. Cl.
*H04L 12/66* (2006.01)
*H04Q 7/20* (2006.01)

(52) U.S. Cl. .................................... 370/352; 455/456.1

(58) Field of Classification Search ................. 370/352; 455/456.1
See application file for complete search history.

(56) References Cited

U.S. PATENT DOCUMENTS

| 7,170,943 | B1 * | 1/2007 | Van Heeswyk et al. | 375/259 |
| 2001/0041973 | A1 * | 11/2001 | Abkowitz et al. | 703/23 |
| 2004/0137917 | A1 * | 7/2004 | Ohto et al. | 455/456.1 |
| 2004/0248562 | A1 * | 12/2004 | Kim | 455/414.4 |
| 2005/0174994 | A1 * | 8/2005 | Park | 370/352 |
| 2006/0168266 | A1 * | 7/2006 | Phillips et al. | 709/230 |

FOREIGN PATENT DOCUMENTS

| JP | 64-36191 | 2/1989 |
| JP | 6-37752 | 2/1994 |
| JP | 2000-134361 | 5/2000 |
| JP | 2003-92640 | 3/2003 |
| JP | 2004-120259 | 4/2004 |
| JP | 2005-39660 | 2/2005 |

OTHER PUBLICATIONS

Japanese Office Action dated Aug. 4, 2005 (and English translation of relevant portion).
Japanese Office Action dated Aug. 4, 2005 (and English translation of relevant portion).

* cited by examiner

*Primary Examiner*—William J Deane
(74) *Attorney, Agent, or Firm*—Dickstein, Shapiro, LLP

(57) ABSTRACT

When a setting in an IP telephone terminal is to be changed, a remote resetter registers subscriber information corresponding to this IP telephone terminal and places a call to this IP telephone terminal. The IP telephone terminal sends a setup request to a setup server if an incoming call is from a pre-registered source. When the IP telephone terminal receives, as a response to this request, setup information from the setup server, the IP telephone terminal sets the setup information and sends a setup completion notification to the remote resetter. Upon receipt of the setup completion notification, the remote resetter deletes the subscriber information corresponding to this IP telephone terminal.

24 Claims, 7 Drawing Sheets

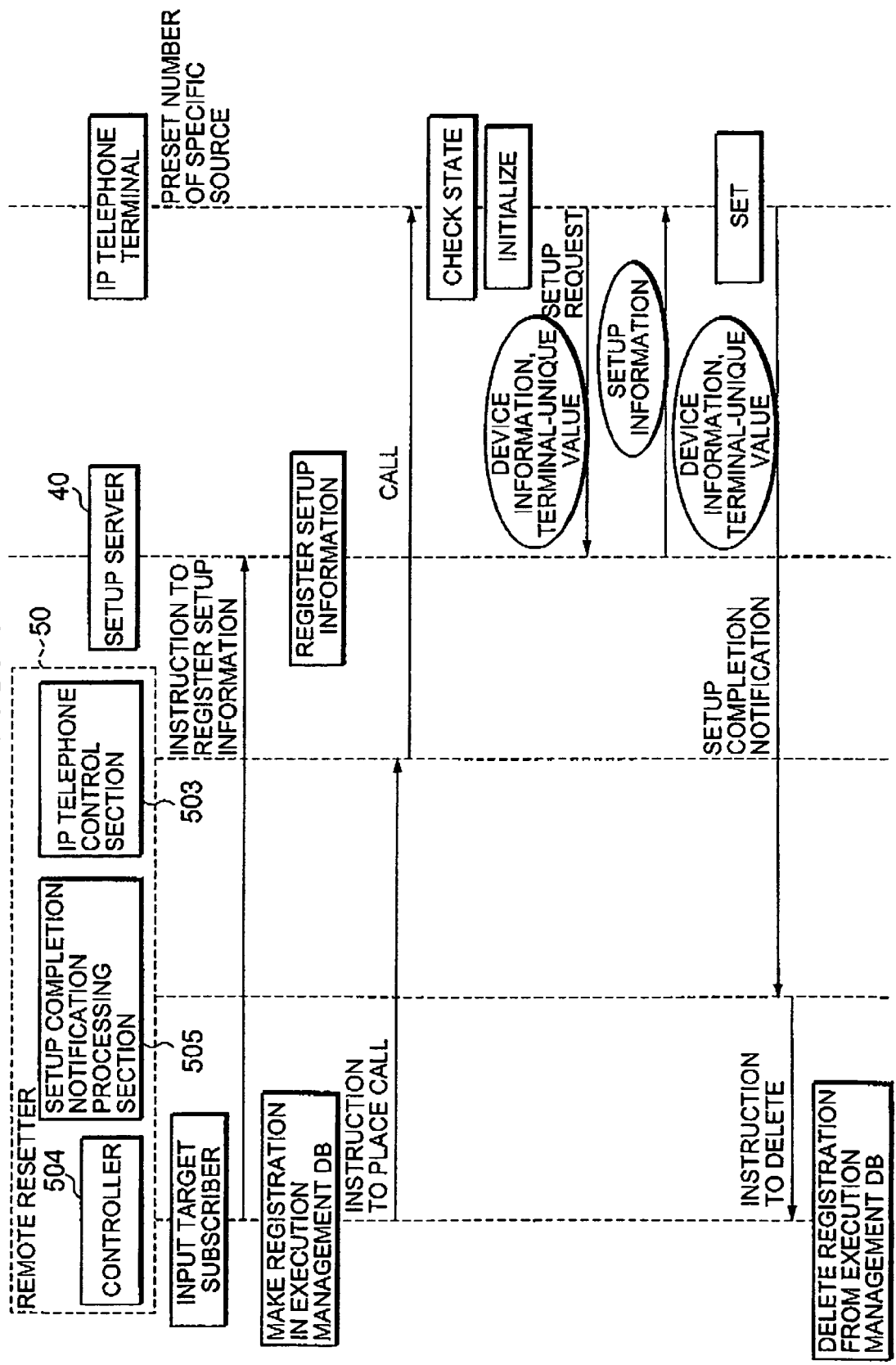

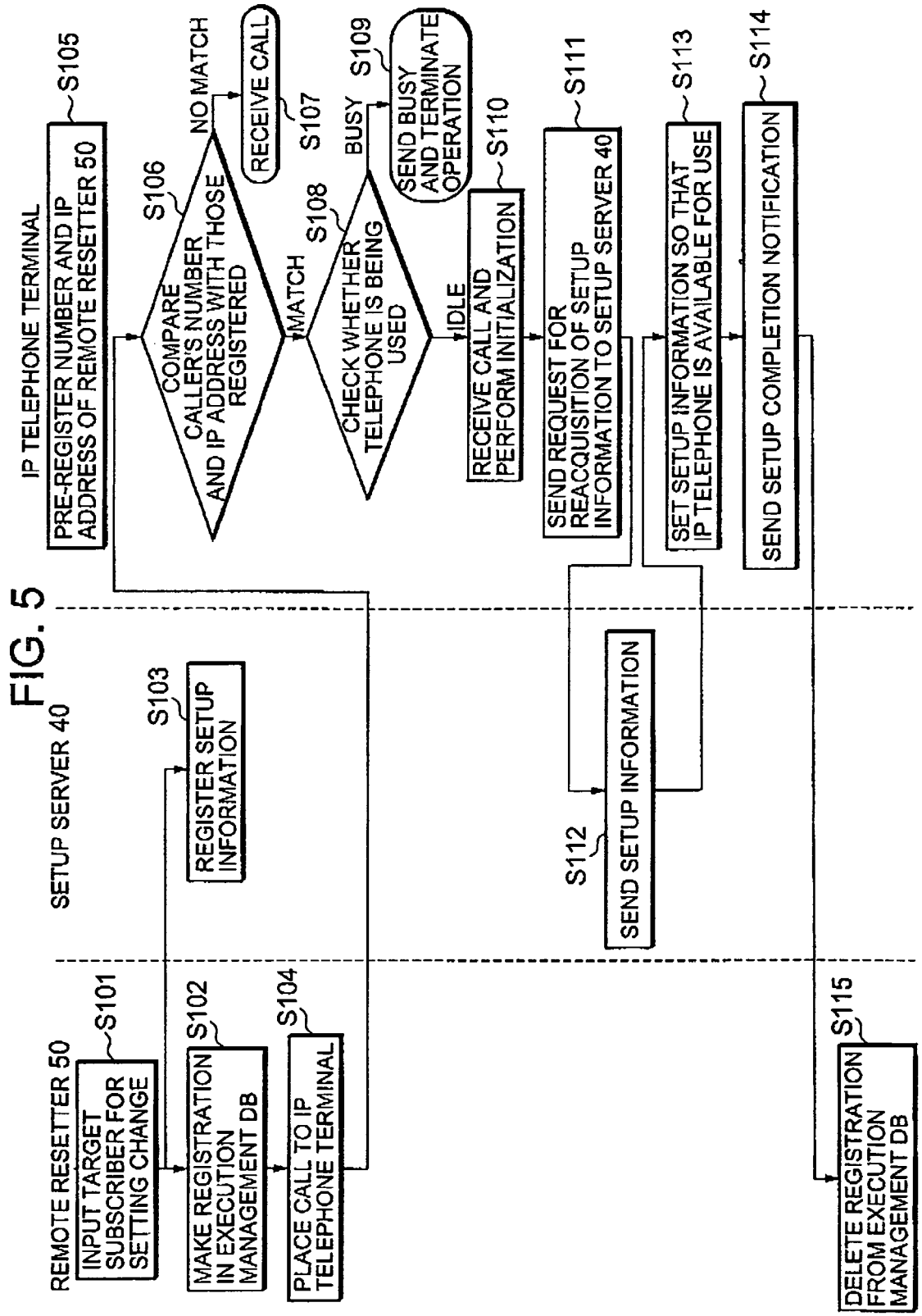

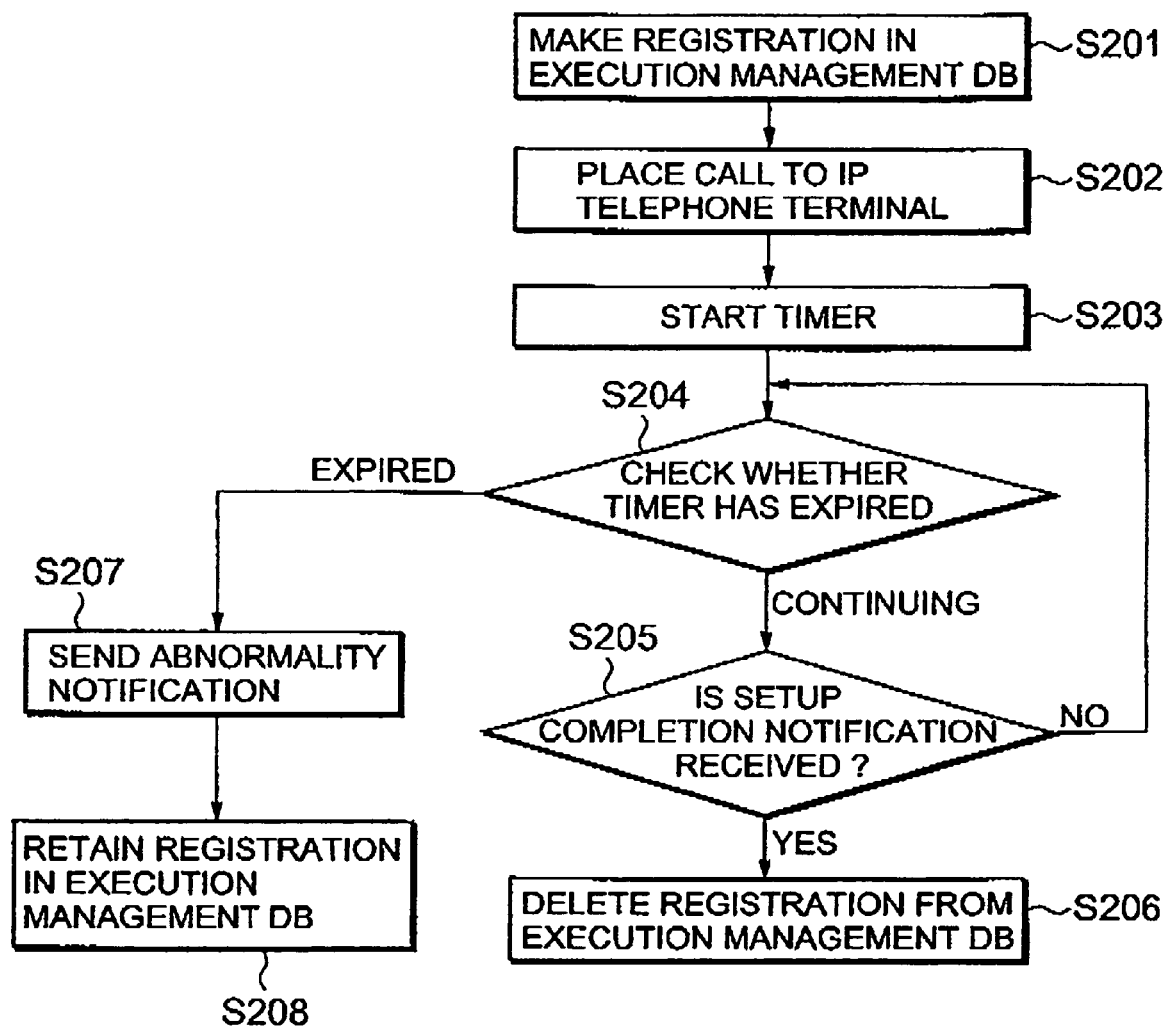

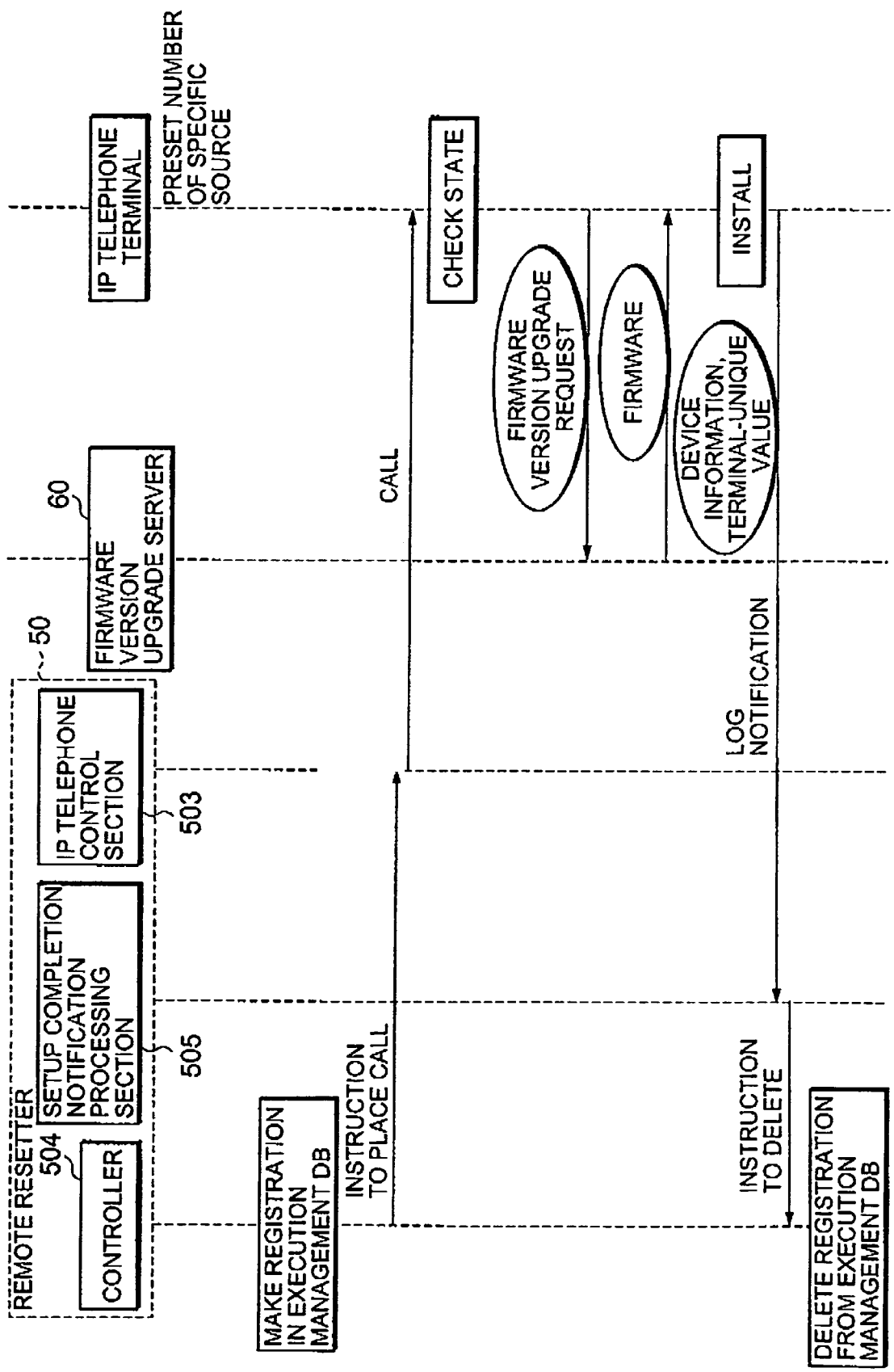

SYSTEM AND METHOD FOR REMOTELY CONTROLLING A COMMUNICATION TERMINAL

BACKGROUND OF THE INVENTION

1. Field of the Invention

The present invention relates to a remote control system for remotely controlling a communication terminal and, more particularly, to a system and method for enabling a remote manager to change a setting in a communication terminal.

2. Description of the Related Art

Various systems have hitherto been proposed for remotely controlling a communication terminal such as a telephone device or an information communication terminal. For example, Japanese Patent Application Unexamined Publication No. S64-36191 discloses a remote control system in which a remote maintenance terminal sends setup information to a communication terminal by using a user-user information element in a SETUP message and the communication terminal sends a setup completion notification back to the remote maintenance terminal similarly by using the user-user information element.

Japanese Patent Application Unexamined Publication No. 2003-92640 discloses a telephone communication controller that has a predetermined telephone number registered beforehand and, when the telephone number of a caller matches the registered number, permits remote control of the caller. Similarly, Japanese Patent Application Unexamined Publication No. H6-37752 discloses a technology for increasing security by checking the source IP address.

However, in the conventional remote control systems, the setup information is unilaterally transmitted to the communication terminal, and it has been impossible to efficiently execute a setting change on a large number of communication terminals. For example, in the system according to Japanese Patent Application Unexamined Publication No. S64-36191, setup of the communication terminal cannot be complete unless the remote maintenance terminal receives the setup completion notification. Therefore, if a setting in each of a large number of communication terminals is updated, heavy load will be imposed on the remote maintenance terminal.

Moreover, a communication terminal is not always available for a setting change when a management device transmits setup information to the communication terminal, because the user of the communication terminal cannot know when a setting change occurs. Reversely, in the case where polling to reset the communication terminal side is performed periodically, the server side cannot execute a setting change at an arbitrary timing. Accordingly, the problem arises that even when setup information is changed to the latest version, the setting cannot be updated promptly.

Furthermore, in the case where setup information is set externally through access established by using HTTP or TEL-NET, the possibility cannot be denied that a communication terminal is controlled through unauthorized access and the internal information is stolen. In the above-described systems according to Japanese Patent Application Unexamined Publication Nos. 2003-92640 and H6-37752, unauthorized access is prevented by checking the caller's telephone number or source IP address. However, once passing through this checking, unauthorized access is allowed to the inside of a communication terminal.

Japanese Patent Application Unexamined Publication No. 2004-120259 discloses a data management system in which a server is provided with a memory storing a directory used to store internal data for each facsimile device so as to manage internal data of the facsimile device and further an instruction of a client device is sent to the server through the facsimile device.

Japanese Patent Application Unexamined Publication No. 2000-134361 discloses a setting-updatable telephone device which is capable of refusing a setting-update request from a calling telephone device.

SUMMARY OF THE INVENTION

According to the present invention, a remote control function of activating a setting update operation of a communication terminal and an information providing function of providing information to be acquired by the communication terminal are provided separately.

Since the remote control function and the information providing function are separated from each other, respective communication terminals can obtain necessary information depending on a status of each communication terminal. In other words, the remote control function performs activation of setting update operation and the information providing function performs delivery of information to a communication terminal originating an information request, resulting in reduced load on the network, dramatically reduced load on the remote control side, and high-speed updating of a plurality of communication terminals. In addition, since the remote controller activates the updating of a communication terminal, it is possible for a service provider to update a communication terminal at arbitrary timing and thereby updating the setting of the communication terminal to the latest setting state without substantial delay.

According to an aspect of the present invention, a remote control system includes: a remote controller for placing a call to a communication terminal when changing a setting of the communication terminal, wherein the remote controller notifies the information provider of identification information for identifying the communication terminal; and an information provider for transmitting information to the communication terminal identified by the identification information in response to a setting request received from the communication terminal.

The communication terminal preferably transmits a setting completion notification to the remote controller when a setting of the information received from the information provider has completed.

As an embodiment of the present invention, the information provider may be a server which stores setting information for a communication terminal to obtain predetermined services from the communication network. As another embodiment of the present invention, the information provider may be a server which stores firmware to be set to a communication terminal.

The communication terminal may be an IP telephone terminal, wherein identification information for identifying the communication terminal is a combination of an IP address of the IP telephone terminal and a message section of an IP telephones protocol.

According to another aspect of the present invention, a remote controller places a call to a communication terminal when changing a setting of the communication terminal, and notifies an information provider of identification information for identifying the communication terminal; the communication terminal transmits a setting request to the information provider when receiving the call from the remote controller; the information provider receives the setting request from the communication terminal, identifies the communication terminal based on the identification information notified by the remote controller, and transmitting information to the communication terminal in response to the setting request.

According to still another aspect of the present invention, a communication terminal includes: a memory for storing identification information for identifying the remote controller; and a controller controlling such that, when an incoming call occurs, it is determined whether source information of the incoming call matches the identification information of the remote controller and, when it is determined that source information of the incoming call matches the identification information of the remote controller, the information request is transmitted to the information provider and the setting information is received as a response to the information request from the information provider.

The communication terminal may further include an initialization section for initializing current setting information when it is determined that source information of the incoming call matches the identification information of the remote controller.

Preferably, the controller may check a use status when it is determined that source information of the incoming call matches the identification information of the remote controller, wherein, when the use status indicates that the communication terminal is not used, the controller instructs the initialization section to initialize the current setting information.

According to further another aspect of the present invention, a remote controller includes: a memory for storing management information including identification information for identifying a communication terminal which is designated as a setting-changed target by a service provider; and a controller for placing a call to the communication terminal designated and notifying an information provider of identification information for identifying the communication terminal, wherein the information provider transmits setting information to the communication terminal in response to an information request received from the communication terminal.

The remote controller may further include a timer for measuring a time elapsed from when placing the call to the communication terminal, wherein the controller deletes management information regarding the communication terminal from the memory when having received a setting completion notification from the communication terminal within a predetermined time period elapsed from when placing the call to the communication terminal. If the controller has not received a setting completion notification from the communication terminal within the predetermined time period, then the controller notifies the service provider of not receiving the setting completion notification from the communication terminal.

As described above, the remote controller places a call to a communication terminal so as to active the update operation of the communication terminal and therefore no setting information is transmitted from the remote controller to the communication terminal. The setting information is downloaded by the communication terminal getting access to the information provider. Accordingly, by the communication terminal only checking whether an incoming call is originated by a predetermined remote controller, unauthorized access and setting can be effectively prevented, resulting in enhanced security. Further, a communication terminal gets access to the information provider to obtain necessary information and therefore the user of the communication terminal can easily know service changes.

BRIEF DESCRIPTION OF THE DRAWINGS

FIG. 4 is a sequence diagram showing a remote control method according to the first embodiment.

FIG. 5 is a flowchart schematically showing the collaboration between the remote resetter, setup server and IP telephone terminal on their operations according to the first embodiment.

FIG. 6 is a flowchart showing a control flow concerning an execution management database of the remote resetter according to the first embodiment.

FIG. 7 is a sequence diagram showing a remote control method according to another embodiment of the present invention.

DETAILED DESCRIPTION OF THE PREFERRED EMBODIMENTS

1. System Configuration

Hereinafter, a system for IP telephone terminals using an IP telephony network will be described as a preferred example.

Figure 1:
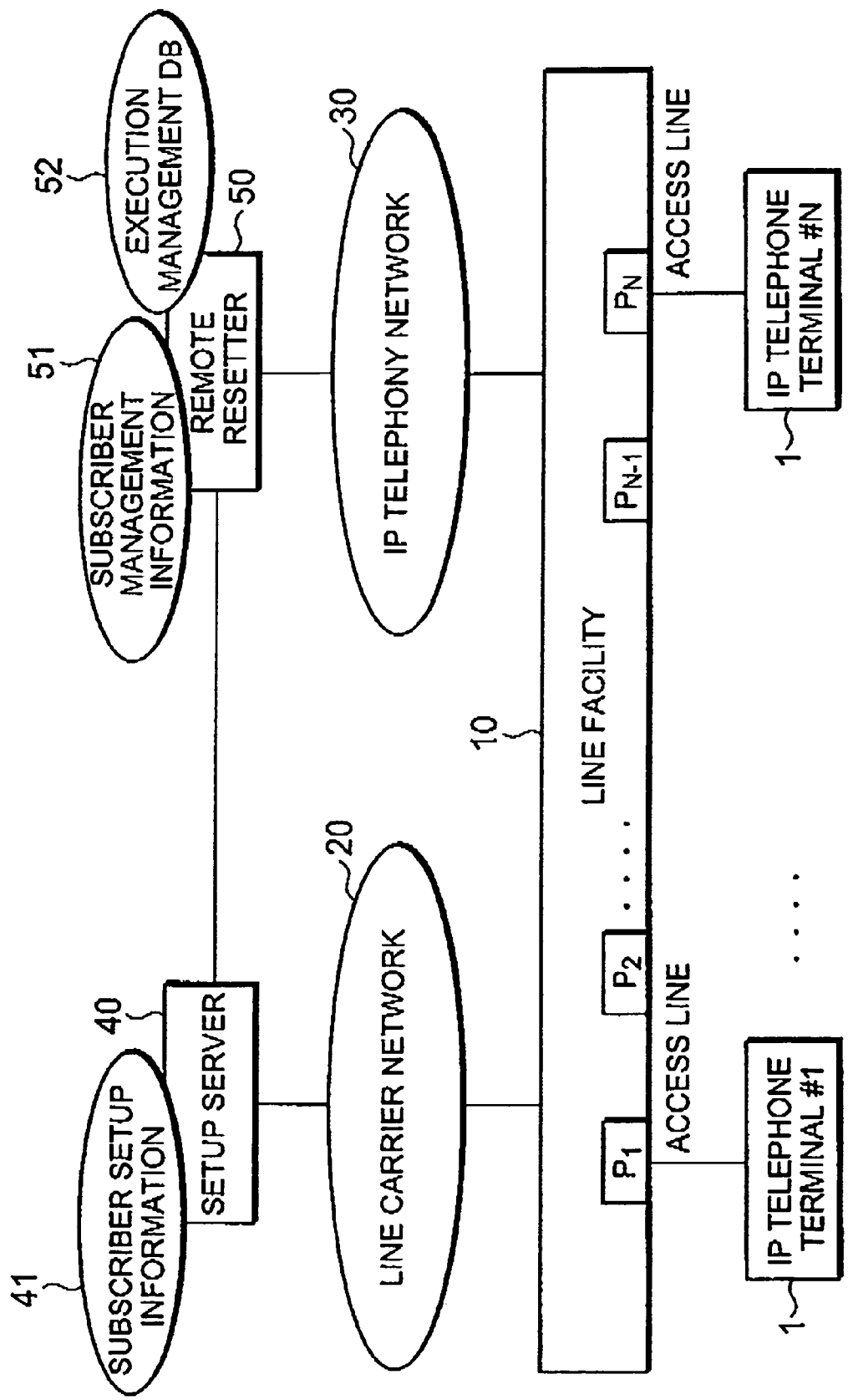
FIG. 1 is a block diagram showing a configuration of a remote control system according to a first embodiment of the present invention.

Referring to FIG. 1, a plurality of IP telephone terminals 1 (here, N IP telephone terminals) are physically connected to physical ports $P_1$ to $P_N$ of a line facility 10, respectively, through respective access lines. The line facility 10 is network connection equipment which connects the access lines to a line carrier network 20 and to an IP telephony network 30 and is managed by a line carrier. The line carrier provides the use of the access lines to subscribers. A setup server 40, as an information providing device, is connected to the line carrier network 20, and a remote resetter 50, as a remote control device, is connected to the IP telephony network 30. The setup server 40 and remote resetter 50 are provided separately but are communicably connected to each other.

The IP telephone terminal is a network-connected device to be installed in the premises (home, office or the like) of a subscriber who makes a contract with an IP telephony service provider to use its services. The IP telephone terminal may be an IP telephone device having telephone functions in itself or may be of a terminal adapter type with a telephone device attached externally. However, the IP telephone terminal has a function of executing setup processing through the line carrier network 20 automatically when the IP telephone terminal in the state as it was shipped from a factory is physically connected to an access line. Such a function is well known and is being operated by line carriers and IP telephony service providers.

The setup server 40 is an information processing device, such as a Web server, managed by the line carrier and has a database for storing subscriber setup information 41 for the subscribers who have made the contract to use the services. The setup server 40 has a function of transmitting the setup information in response to a setup request from an IP telephone terminal, in collaboration with the remote resetter 50 as described below.

The remote resetter 50 has subscriber management information 51 and an execution management database 52 and has a function of placing a call to notify an IP telephone terminal of a setting change, which will be described later. When an IP telephone terminal receives this call, the IP telephone terminal checks its own current operation state and, if available to be set up, sends a setup request to the setup server 40, so that the IP telephone terminal downloads the setup information from the setup server 40 and executes setup processing.

1.1) Communication Terminal

Figure 2:
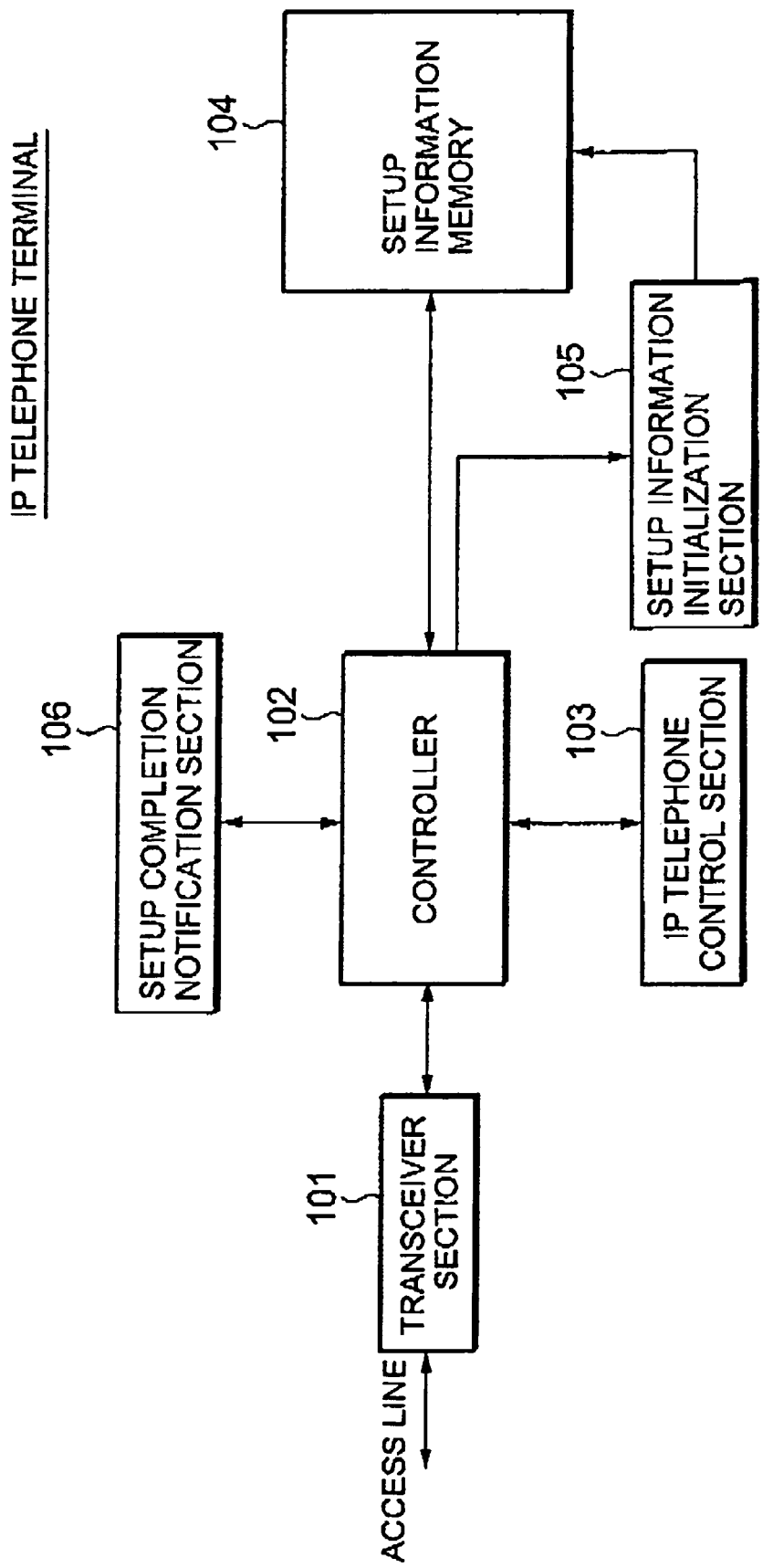
FIG. 2 is a block diagram schematically showing a configuration of an IP telephone terminal in the remote control system according to the first embodiment.

FIG. 2 schematically shows a circuit structure of an IP telephone terminal in the remote control system according to the first embodiment. Note that FIG. 2 only depicts the part relevant to the present invention, and the other part is omitted.

Referring to FIG. 2, the IP telephone terminal includes a transceiver section 101 to be connected to one of the physical ports of the line facility 10. The transceiver section 101 also performs, for example, Ethernet™ framing processing and the like. Under the control of a controller 102, the IP telephone terminal can communicate with the setup server 40 or remote resetter 50 through the access line.

IP telephone functions are performed by an IP telephone control section 103, based on control information set in a setup information memory 104. Specifically, the following are executed: controlling outgoing and incoming IP telephone calls; determining, by using specific-source information stored in the setup information memory 104, whether or not an incoming call is a call placed from a specific device (here, the remote resetter 50); and, when the call is from the specific device, instructing the controller 102 to have a setup information initialization section 105 initialize the setup information memory 104.

The setup information memory 104 stores information required for the IP telephone functions and can store the latest version of control information downloaded from the setup server 40, which will be described later. Moreover, the contents of the setup information memory 104 are initialized by the setup information initialization section 105, under the control of the controller 102. After initialization of the setup information memory 104, when setup information is acquired and stored in the setup information memory 104, a setup completion notification section 106 creates a setup completion notification and, under the control of the controller 102, sends the notification to the remote resetter 50 over the IP telephony network 30.

The controller 102, concretely, is a program-controlled processor that controls the entire operation of the IP telephone terminal, and executes control of the above-described functions by carrying out programs stored in a memory (not shown). Incidentally, each of the above-described functions can also be implemented by a program.

For example, control of access to the setup server 40 and to the remote resetter 50 can be executed by using an application (a program for executing access to a Web server).

The setup information memory 104 in the state as shipped from a factory has stored information (line carrier common information) for connection to the line carrier network 20 beforehand. When setup information is downloaded from the setup server 40 and set in the setup information memory 104, then it becomes possible to receive IP telephone services using the IP telephony network 30. Additionally, as the specific-source information, the telephone number and IP address of the remote resetter 50 may be stored in the setup information memory 104 at the time of shipment from a factory, or may be set in the setup information memory 104 by the setup server 40. Note that for increased security, it is also possible to define a special code in an IP telephony protocol and to have the code identified.

1.2) Remote Resetter

Figure 3:
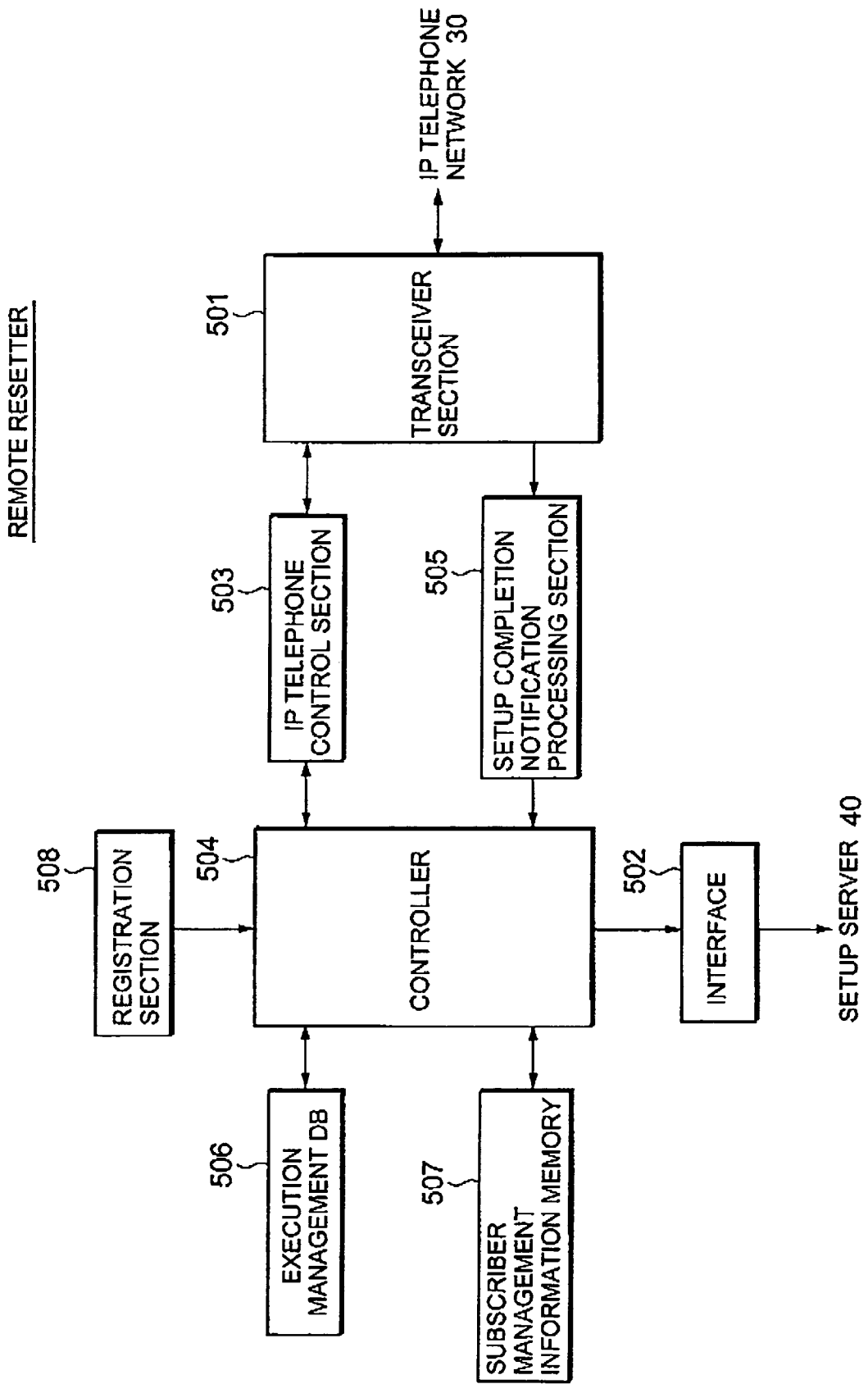
FIG. 3 is a block diagram schematically showing a configuration of a remote resetter in the remote control system according to the first embodiment.

FIG. 3 schematically shows a circuit structure of the remote resetter in the remote control system according to the first embodiment. The remote resetter 50 includes a transceiver section 501 for performing transmission/reception over the IP telephony network 30 and an interface 502 for allowing collaboration with the setup server 40. The transceiver section 501 also performs, for example, Ethernet™ framing processing and the like.

The remote resetter 50 further includes an IP telephone control section 503, a controller 504 and a setup completion notification processing section 505. By these sections, the following are executed: placing a call to an IP telephone terminal that needs resetting; receiving a setup completion notification from the IP telephone terminal; and performing setup completion processing. The controller 504 controls the entire operation of the remote resetter 50 by using an execution management database 506 and a subscriber management information memory 507. An IP telephone terminal that needs resetting is designated by the IP telephony service provider through a registration section 508. In other words, the registration section 508 provides an interface through which the IP telephony service provider can designate, to the remote resetter 50, an IP telephone terminal that needs a setting change.

The subscriber management information memory 507 stores management information on each subscriber, including the IP telephone number, device identification information on the corresponding IP telephone terminal, version of the current setup information, and the like. The device identification information is information with which the setup server 40 can identify a device to set up. For example, the device identification information is unique information such as an identification ID and a password required when an IP telephone terminal gains access by using HTTP or the like, or a MAC address uniquely assigned to an IP telephone terminal.

The IP telephone number and device identification information of an IP telephone terminal to be subjected to a setting change are registered in the execution management database 506. When the necessity arises to change the subscriber management information on a subscriber due to a change in the services, the IP telephony service provider designates this subscriber through the registration section 508. The controller 504 retrieves the IP telephone number and device identification information corresponding to this designated subscriber from the subscriber management information memory 507 and registers them in the execution management database 506.

Thereafter, the controller 504 places a call to the IP telephone terminal of this subscriber registered in the execution management database 506. At this time, information for identifying the remote resetter 50 as the caller may be added by utilizing the message field of the IP telephony protocol.

Upon receipt of a setup completion notification from the IP telephone terminal of the subscriber, the setup completion notification processing section 505 outputs to the controller 504 an instruction to delete the registered information concerning the subscriber in question from the execution management database 506.

Note that the configuration of the remote resetter 50 is not restricted to the one shown in FIG. 3. For example, as another configuration, a personal computer may be used as the controller 504 with the execution management database 506 and subscriber management information memory 507 connected thereto, and the transceiver section 501, IP telephone control section 503 and setup completion notification processing section 505 may be connected to the personal computer.

Moreover, the IP telephone control section 503 does not need to be incorporated in the remote resetter 50. For example, as another configuration, a modem or an IP telephone device having IP telephone functions that are externally controllable with commands may be connected to a personal computer so that a call to an IP telephone terminal can be placed by the control from the personal computer. Furthermore, the setup completion notification processing section 505 can also be composed of an independent personal computer.

The controller 504, concretely, is a program-controlled processor that controls the entire operation of the remote resetter, and executes control of the above-described functions by carrying out programs stored in a memory (not shown).

2. System Operation

FIG. 4 shows a remote control method according to the first embodiment, and FIG. 5 schematically shows the collaboration between the remote resetter 50, setup server 40 and IP telephone terminal on their operations. Since FIGS. 4 and 5 depict substantially the same remote control operations, the system operation will be described below particularly along the flowchart of FIG. 5.

When the necessity arises to change a setting for a subscriber to the IP telephone services, the IP telephony service provider inputs, through the registration section 508, the target subscriber for whom a setting change is to be executed (step S101). When the target subscriber is inputted, the controller 504 refers to the subscriber management information memory 507 and registers the IP telephone number and device identification information corresponding to this target subscriber in the execution management database 506 (step S102). At the same time, through the interface 502, the controller 504 sends an instruction to register updated setup information, as well as the IP telephone number and device identification information, to the setup server 40, where the setup information are registered (step S103).

Subsequently, the controller 504 instructs the IP telephone control section 503 to call the IP telephone number of the subscriber, and the IP telephone control section 503 places a call to the corresponding IP telephone terminal from the transceiver section 501 (step S104). As described above, since a call is placed using the IP telephone number of a subscriber, the IP telephony service provider does not need to manage the IP addresses of IP telephone terminals. The controller 504 starts a timer and checks whether or not a setup completion notification responding to this call is received within a predetermined period of time, which will be described later.

On the IP telephone terminal side, the telephone number and IP address of the remote resetter 50 have been registered in the setup information memory 104 (step S105). Accordingly, when the transceiver section 101 detects an incoming call, the controller 102 checks the caller telephone number and source IP address of the IP telephony protocol and determines whether or not the checked telephone number and IP address match those registered in the setup information memory 104 (step S106). At this time, the message field of the IP telephony protocol can be also utilized as information for determination.

When the incoming call is not from the pre-registered source ("NO MATCH" at step S106), the call is treated as an ordinary call (step S107). When the incoming call is from the pre-registered source ("MATCH" at step S106), the controller 102 checks the current use state of the telephone (step S108). If the subscriber is using the telephone ("BUSY" at step S108), the controller 102 terminates this resetting operation and sends "busy" back to the remote resetter 50 through the transceiver section 101 (step S109).

If the subscriber is not using the telephone ("IDLE" at step S108), the controller 102 activates the setup information initialization section 105 in response to this incoming call and has the setup information initialization section 105 initialize the setup information in the setup information memory 104 (step S110). At this time, the subscriber may be notified, by a monitor screen or other notification means (not shown), that the setup information is going to be updated.

When the setup information is initialized, the controller 102 reads from the setup information memory 104 a value unique to the IP telephone terminal (e.g., MAC address or device serial number) and device information (e.g., device name or firmware version) and makes a setup request to the setup server 40 by means of an application of HTTP or the like (step S111).

The setup server 40 has already had the device identification information on the IP telephone terminal to be subjected to a setting change, which was received from the remote resetter 50 and registered at the step S103. Therefore, the setup server 40 can identify the IP telephone terminal to be subjected to a setting change, based on the terminal-unique value and device information in the received setup request. The setup server 40 then sends the updated setup information to the identified IP telephone terminal (step S112).

Upon receipt of the updated setup information from the setup server 40, the controller 102 of the IP telephone terminal stores the received setup information in the setup information memory 104, whereby it becomes possible to receive the IP telephone services (step S113). When setting of the setup information is complete, the controller 102 reads the terminal-unique value and device information of this IP telephone terminal from the setup information memory 104 and sends a setup completion notification to the remote resetter 50 by means of an application of HTTP or the like (step S114).

When the remote resetter 50 receives the setup completion notification within the predetermined period of time, the remote resetter 50 deletes the subscriber information, identified based on the terminal-unique value and device information in the setup completion notification, from the execution management database 506 (step S115). Note that the terminal-unique value and the IP telephone number may be registered beforehand by the IP telephony service provider when the IP telephone terminal is distributed. Moreover, the setup server 40 and the remote resetter 50 may share the terminal-unique value, which the setup server 40 acquires when notified from the IP telephone terminal in the state as it was shipped from a factory.

3. Execution Management By Remote Resetter

FIG. 6 shows a control flow concerning the execution management database of the remote resetter 50 according to the present embodiment.

As described above, when the necessity arises to change a setting for a subscriber to the IP telephone services, the IP telephony service provider inputs, through the registration section 508, the target subscriber for whom a setting change is to be executed. The controller 504 refers to the subscriber management information memory 507 and registers the IP telephone number and device identification information corresponding to this subscriber in the execution management database 506 (step S201). At the same time, the IP telephone number and device identification information are sent to the setup server 40.

Subsequently, under the control of the controller 504, the IP telephone control section 503 places a call to the IP telephone terminal of the subscriber from the transceiver section 501 (step S202) and starts a timer (step S203). The controller 504 determines whether or not a setup completion notification is received (step S205) before the timer has expired ("CONTINUING" at step S204). If the setup completion notification is not received ("NO" at step S205), the process returns to the step S204. If the setup completion notification is received before the timer has expired ("YES" at step S205), the subscriber information, identified based on the terminal-unique value and device information in the setup completion notification, is deleted from the execution management database 506 (step S206).

When the timer has expired before receiving the setup completion notification ("EXPIRED" at step S204), an abnormality notification is sent to the IP telephony service provider (step S207), and the subscriber information in the execution management database 506 is retained (step S208). In this case, it is also possible that the IP telephony service provider designs the operation such that a call is placed again to the IP telephone terminal (step S202).

4. Other Embodiments

In the remote control system according to the above-described embodiment, a description is given of the example of updating the setup information for allowing the use of IP telephone services. However, the present invention is applicable not only to such a case of updating setup information but also to the case of updating firmware. Therefore, a remote control system using a firmware version upgrade server in place of the setup server will be described below.

FIG. 7 shows a remote control method according to another embodiment of the present invention. A remote control system according to this embodiment includes a remote resetter 50, a firmware version upgrade server 60 and a plurality of IP telephone terminals. Note that in FIG. 7, those blocks having the same, or similar, functions as the blocks in the system shown in FIGS. 1 to 4 are given the same reference numerals as in FIGS. 1 to 4.

When the necessity arises to update the firmware for a subscriber to the IP telephone services, the IP telephony service provider inputs, through the registration section 508, the target subscriber who needs a firmware update, and the IP telephone number and device identification information corresponding to this subscriber are registered in the execution management database 506.

Subsequently, the controller 504 instructs the IP telephone control section 503 to call the IP telephone number of the subscriber, and the IP telephone control section 503 places a call to the corresponding IP telephone terminal from the transceiver section 501. As described above, when the call is placed, the controller 504 starts a timer and checks whether or not a setup completion notification responding to this call is received within a predetermined period of time.

On the IP telephone terminal side, the telephone number and IP address of the remote resetter 50 have been registered in the setup information memory 104. Therefore, when the transceiver section 101 detects an incoming call, the controller 102 checks the caller telephone number and source IP address of the IP telephony protocol and determines whether or not the checked telephone number and IP address match those registered in the setup information memory 104. At this time, it is also possible to utilize the message field of the IP telephony protocol as data for determination.

When the incoming call is not from the pre-registered source, the call is treated as an ordinary call. When the incoming call is from the pre-registered source, the controller 102 checks the current use state of the telephone. If the subscriber is using the telephone, the controller 102 terminates this resetting operation and sends "busy" back to the remote resetter 50 through the transceiver section 101. If the subscriber is not using the telephone, the controller 102 makes a version upgrade request to the firmware version upgrade server 60 by means of an application of HTTP or the like. When upgraded firmware is downloaded from the firmware version upgrade server 60, upgrade of the firmware is executed.

When upgrade of the firmware is complete, the controller 102 reads from the setup information memory 104 a value unique to the IP telephone terminal (e.g., MAC address or device serial number) and device information (e.g., device name or firmware version) and sends a setup completion notification to the remote resetter 50 by means of an application of HTTP or the like.

When the remote resetter 50 receives the setup completion notification within the predetermined period of time, the remote resetter 50 deletes the subscriber information, identified based on the terminal-unique value and device information in the setup completion notification, from the execution management database 506.

Note that it is possible to use the combination of the telephone number/IP address and the message field of the IP telephony protocol as the information for identifying the IP telephone terminal as well as for identifying the remote resetter 50. This makes it possible to certainly identify the caller and therefore to effectively prevent "spoofing."

Moreover, in the above-described embodiments, the IP telephone terminal is taken as an example of the communication terminal for description. However, the application of the present invention is not limited to the system for IP telephone terminals. The present invention can be applied to a system for any type of IP communication terminal that has an IP address and can acquire setup information by sending a reset request by means of a specific application.

Furthermore, the line carrier network 20 and the IP telephony network 30 are provided separately in the network diagram shown in FIG. 1. However, it is possible to similarly configure the system with the same single network.

The present invention has a wide range of applications to systems that reset information required for a communication terminal through a network. For example, the present invention is effective in the cases of setting setup information for the use of IP telephone services, setting firmware for allowing a terminal device to operate as an IP terminal, and the like.

The invention claimed is:

1. A remote control system for setting and controlling a plurality of communication terminals connected to a communication network, comprising:

an information providing device which stores setting information relating to each of the plurality of the communication terminals, wherein in response to a setting request received from one of the plurality of communication terminals, the information providing device transmits necessary setting information to the communication terminal; and a remote control device which, when a setting of the communication terminal is to be changed, places a call to the communication terminal and sends identification information of the communication terminal to the information providing device, wherein the communication terminal, upon receipt of an incoming call from the remote control device, transmits the setting request to the information providing device, wherein the information providing device, when receiving the setting request from the communication terminal, identifies the communication terminal using the identification information received from the remote control device and transmits the necessary setting information to the communication terminal.

2. The remote control system according to claim 1, wherein when setting of the necessary setting information received from the information providing device is complete, the communication terminal transmits a setting completion notification to the remote control device.

3. The remote control system according to claim 1, wherein the information providing device is a server which stores information required for each communication terminal to obtain predetermined services from the communication network.

4. The remote control system according to claim 1, wherein the information providing device is a server which stores firmware to be used in setting each communication terminal.

5. The remote control system according to claim 1, wherein each of the plurality of communication terminals is an IP telephone terminal, wherein the received identification information is a combination of an IP address of the IP telephone terminal and a message section in an IP telephone protocol.

6. A remote control method for setting and controlling a plurality of communication terminals connected to a communication network that includes a remote control device and an information providing device, the method comprising:
   the remote control device changing a setting of one of the plurality of communication terminals, the changing including placing a call to the communication terminal and sending identification information of the communication terminal to the information providing device;
   the communication terminal when receiving the call from the remoter control device, requesting necessary information from the information providing device;
   the information providing device identifying the communication terminal originating the request using the identification information received from the remote control device, and, in response to the request received from the communication terminal. transmitting necessary setting information to the communication terminal; and
   the communication terminal changing its own setting based on the necessary setting information received from the information providing device.

7. The remote control method according to claim 6, wherein when the necessary setting of the information received from the information providing device is complete, the communication terminal transmits a setting completion notification to the remote control device.

8. The remote control method according to claim 6, wherein each of the plurality of communication terminals is an IP telephone terminal, wherein the received identification information is a combination of an IP address of the IP telephone terminal and a message section in an IP telephone protocol.

9. The remote control system according to claim 1, each of the plurality of communication terminals comprising:
   a memory which stores identification information of the remote control device; and
   a determiner which, when an incoming call occurs, determines whether source information of the incoming call matches the identification information of the remote control device and,
   a controller which, when it is determined that source information of the incoming call matches the identification information of the remote control device, transmits the information request to the information provider and the setting information is received as a response to the information request from the information provider.

10. The remote control system according to claim 9, each of the plurality of communication terminals further comprising:
   an initialization section, which initializes current setting information when it is determined that source information of the incoming call matches the identification information of the remote control device.

11. The remote control system according to claim 9, wherein the controller checks a terminal use status when it is determined that source information of the incoming call matches the identification information of the remote controller, and wherein, when the communication terminal is not used, the controller instructs the initialization section to initialize the current setting information.

12. The remote control system according to claim 9, wherein when a setting of the information received from the information providing device has been set, the controller transmits a setting completion notification to the remote controller 13. The remote control system according to claim 9, wherein each of the plurality of communication terminals is an IP telephone terminal and the communication network is an IP telephone network, wherein the received identification information is a combination of an IP address of the IP telephone terminal and a message section in an IP telephone protocol.

14. A remote control device for setting and controlling a setting of a predetermined service in each of a plurality of communication terminals connected to a communication network in collaboration with an information providing device which stores setting information relating to each of the plurality of communication terminals, wherein in response to a setting request received from one of the plurality of communication terminals, the information providing device transmits necessary setting information to the communication terminal, the remote control device comprising:
   a memory for storing management information for identifying whether the communication terminal is designated as a setting-changed target by a predetermined service provider; and
   a controller for placing a call to the designated communication terminal so as to request setting information and sending identification information of the communication terminal to the information providing device so that the information providing device can identify a setting request received from the communication terminal; and
   a controller which, when having received a setting completion notification that indicates completion of the setting of the communication terminal, deletes the management information from the storage means.

15. The remote control device according to claim 14, further comprising:
   a timer for measuring a time elapsed from placement of the call to the communication terminal,
   wherein the controller deletes the management information from the memory when having received a setting completion notification within a predetermined time period.

16. The remote control device according to claim 15, wherein the service provider is notified by the controller when the controller has not received a setting completion notification within the predetermined time period.

17. The remote control device according to claim 14, wherein each of the plurality of communication terminals is an IP telephone terminal, wherein received the identification information is a combination of an IP address of the IP telephone terminal and a message section in an IP telephone protocol.

18. A remote control method for setting and controlling a setting of a predetermined service in each of a plurality of communication terminals connected to a communication network in collaboration with an information providing device which stores setting information relating to each of the plurality of communication terminals, wherein in response to a setting request received from a communication terminal, the information providing device transmits necessary setting information to the communication terminal, the method comprising:
  registering management information for identifying at least one of the plurality of communication terminals which is designated as a setting-changed target by a provider of the predetermined service;
  placing a call to the designated at least one communication terminal designated so as to request setting information and sending identification information of the at least one communication terminal to the information providing device so that the information providing device can identify a setting request received from the communication terminal; and
  when having received a setting completion notification that indicates completion of the setting of the communication terminal, deleting the management information.

19. The remote control method according to claim 18, wherein each of the plurality of communication terminals is an IP telephone terminal, wherein the received identification information is a combination of an IP address of the IP telephone terminal and a message section in an IP telephone protocol.

20. A computer-readable storage medium, storing a computer program which instructs a computer to set and control a setting of a predetermined service in each of a plurality of communication terminals connected to a communication network in collaboration with an information providing device which stores setting information relating to each of the plurality of communication terminals, wherein in response to a setting request received from one of the plurality of communication terminals, the information providing device transmits necessary setting information to the communication terminal, the program causing the computer to perform the steps of:
  registering management information identifying at least one of the plurality of communication terminals which is designated as a setting-changed target by a service provider; and
  placing a call to the designated communication terminal so as to request setting information and sending identification information of the communication terminal to the information providing device so that the information providing device can identify a setting request received from the communication terminal; and
  when having received a setting completion notification that indicates completion of the setting of the communication terminal, deleting the management information.

21. The program according to claim 20, wherein each of the plurality of communication terminals is an IP telephone terminal, wherein the received identification information is a combination of an IP address of the IP telephone terminal and a message section in an IP telephone protocol.

22. A remote control system for setting and controlling a plurality of communication terminals connected to a communication network, comprising:
  remote control means for placing a call to one of the plurality of communication terminals when changing a setting of the communication terminal, wherein the remote control means sends identification information of the communication terminal to information providing means; and
  the information providing means, which stores setting information to be set to each of the plurality of the communication terminals, for transmitting necessary information to the communication terminal identified by the identification information in response to a setting request received from the communication terminal,
  wherein the communication terminal, upon receipt of an incoming call from the remote control means, transmits the setting request to the information providing means, wherein the information providing means, when receiving the setting request from the communication terminal, identifies the communication terminal using the identification information received from the remote control means and transmits the necessary setting information to the communication terminal.

23. The remote control system according to claim 1, each of the plurality of communication terminals comprising:
  storage means which stores identification information of the remote control device:
  determining means which, when an incoming call occurs, determines whether source information of the incoming call matches the identification information of the remote control device; and
  control means which, when it is determined that source information of the incoming call matches the identification information of the remote control device transmits the information request to the information providing device and setting the setting information, as a response to the information request, received from the information providing device.

24. A remote control device for setting and controlling a setting of a predetermined service in each of a plurality of communication terminals connected to a communication network in collaboration with an information providing device which stores setting information relating to each of the plurality of communication terminals, wherein in response to a setting request received from a communication terminal, the information providing device transmits necessary setting information to the communication terminal, the remote control device comprising:
  storage means which registers management information for identifying a communication terminal which is designated as a setting-changed target by a predetermined service provider;
  communication means which places a call to the designated communication terminal so as to request setting information and sends identification information of the communication terminal to the information device so that the information providing device can identify a setting request received from the communication terminal; and
  control means which, when having received a setting completion notification that indicates completion of the setting of the communication terminal, deletes the management information from the storage means.

* * * * *